(No Model.) 2 Sheets—Sheet 1.
L. A. ASPINWALL.
POTATO DIGGER.
No. 372,351. Patented Nov. 1, 1887.
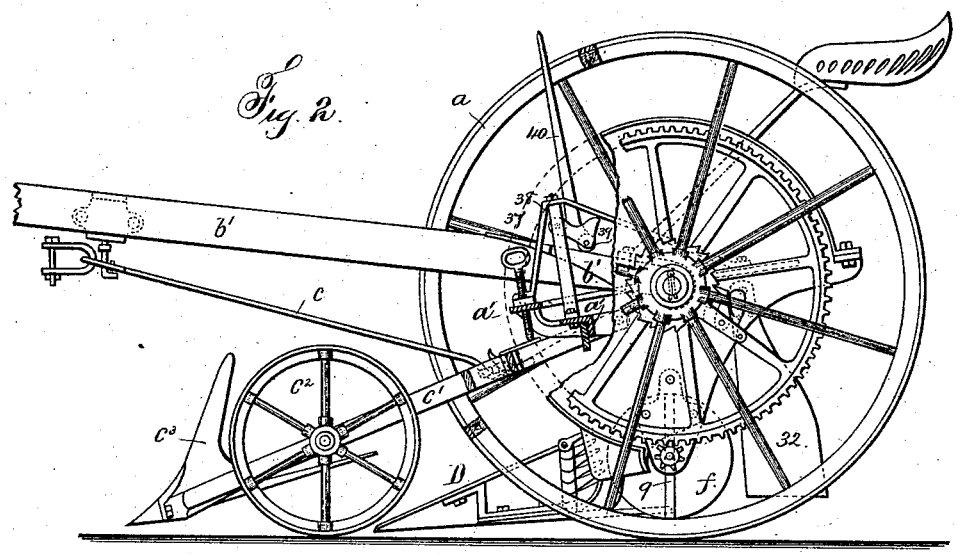
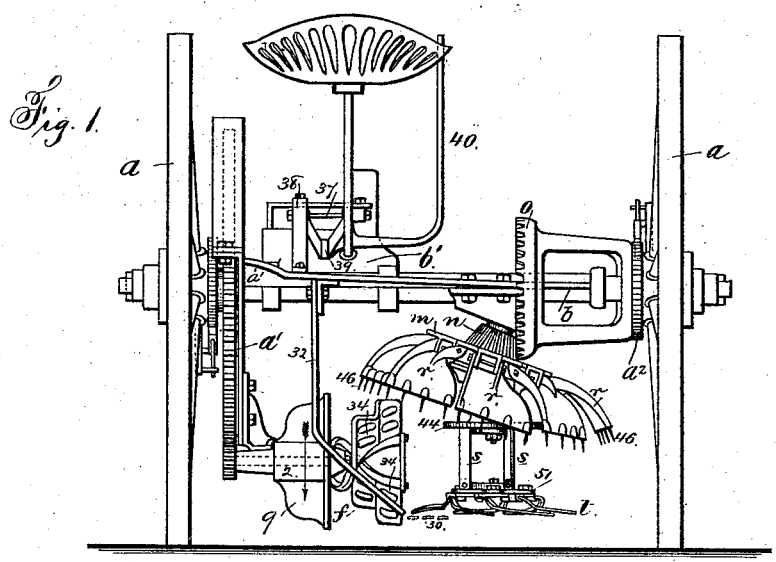
Witnesses
Harold Serrell
Chas H Smith
Inventor
Lewis Augustus Aspinwall
per Lemuel W Serrell
atty.

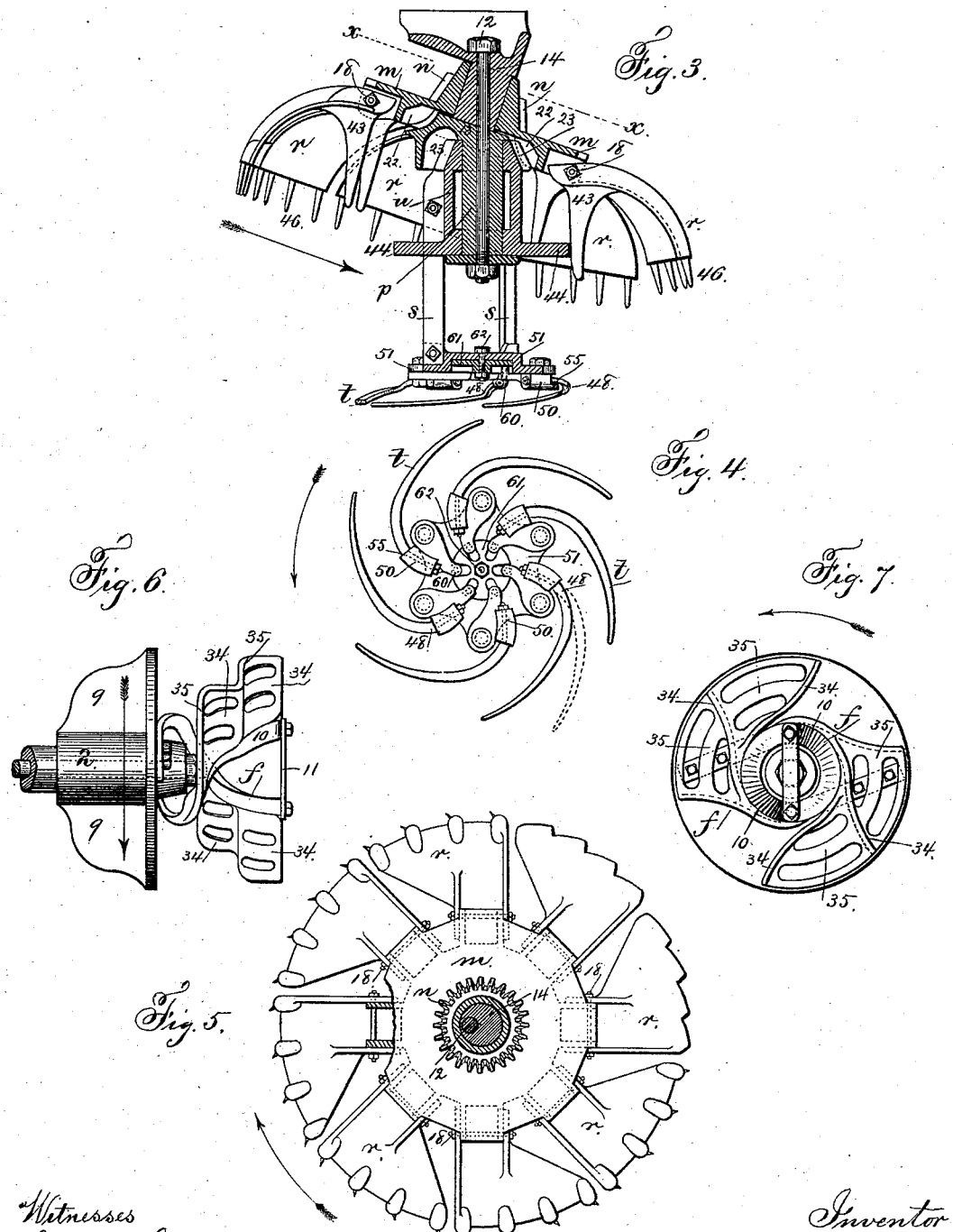

UNITED STATES PATENT OFFICE.

LEWIS AUGS. ASPINWALL, OF TRENTON, NEW JERSEY.

POTATO-DIGGER.

SPECIFICATION forming part of Letters Patent No. 372,351, dated November 1, 1887.

Application filed November 3, 1882. Serial No. 75,818. (No model.)

*To all whom it may concern:*

Be it known that I, LEWIS AUGUSTUS ASPINWALL, of Trenton, in the State of New Jersey, have invented an Improvement in Potato-Diggers, of which the following is a specification.

This invention is an improvement upon the potato-digger heretofore invented and patented by me; and it relates to the top and weed turner and to the leveling-fingers, also to the peculiar construction of the step-screw.

In the drawings, Figure 1 is a rear view. Fig. 2 is a side view of the machine. Fig. 3 is a vertical section of the top turner and the leveler. Fig. 4 is an inverted plan of the leveler. Fig. 5 is a plan of the top-turner at the line $x\ x$ of Fig. 3. Fig. 6 is a side view. Fig. 7 is an end view of the step-screw used for raising the potatoes and separating them from the earth, and Fig. 8 is a plan of the plow and underground colter.

The driving-wheels $a\ a$ are upon an axle, $b$, and there is a tongue, $b'$, to which horses are attached. The draft-bar $c$ passes to the frame $c'$, which carries the wheel $c^2$ and divider $c^3$.

The earth is raised by a plow, D, Fig. 8, and the potatoes pass over the fingers $q$, as in my Patent No. 264,603, dated September 19, 1882, to the step-screw $f$, which step-screw is upon a gudgeon, 2, and it is rotated in the direction of the arrow, as heretofore used in machines made by me; but instead of the blade or underground colter being in the form of a diagonal bar, as in my said patent, I provide fingers 30, that extend backwardly and slightly below the leveling-fingers, hereinafter described. The object of this is to prevent any potatoes falling in front of or in the way of the discharge from the spring guide-plate, thus preventing all chance of covering by spring guide-plate, next described. This colter may be constructed solid, instead of being made with fingers, and will answer the same purpose.

Upon reference to the side view, Fig. 2, and rear view, Fig. 1, it will be seen that there is a spring guide-plate, 32, hanging down below the frame at the rear of the step-screw $f$, and the lower end is a broad inclined plane, so that as the potatoes are thrown to the rear over and by the step-screw a portion falls upon the said inclined spring guide-plate, which discharges the earth and the potatoes down upon the nearly level surface or road that is made by the colter-fingers, thus reducing the depth of earth in the rear of the step-screw and exposing all the potatoes. The object of a spring guide-plate is to enable a continuous discharge of earth caused by the movement of the machine giving a constant vibration to the same; but it may be made rigid, if desired.

The step-screw is made with reference to separating the earth from the potatoes by throwing them over itself, and with this object in view I have improved upon the form heretofore employed by me for the twofold purpose of removing any angles that might injure the potatoes and for passing the latter toward the level surface and preventing the potatoes falling into the trench or furrow and being covered, or partially so, with earth.

I also construct the step-screw head with two paddles, 9, for the purpose of removing any sods or stones that are likely to fall between the plow-standard and said head. In my previous patents I have no such device. These paddles may be of various forms or shapes; but so long as the same serves to remove obstructions the desired object is obtained.

The general form of the step-screw is that of a double corkscrew, having the convoluted or screw-shaped portions 10, and having about three-quarters of a turn, and there are blades 34 upon the step-screw, having a concave form, as seen in Fig. 7, so as to receive upon them the earth as delivered by the plow, and the sides of these inclined blades are plates 35, that occupy planes at right angles, or nearly so, to the axis of rotation, and 11 is a cross-brace between the outer ends of the step-screw. The blades 34 and plates 35 are perforated or formed of open-work, so as to prevent the earth balling in wet digging, while more of the potatoes will be thrown off to the right than when the angles are sharp, as in my previous form of step-screw. The principal object of this change is to effect a more perfect side delivery toward the right, so as to facilitate picking up the potatoes, as well as to keep an open road for the horses.

In order to raise the plow, the frame $a$, that is connected to the plow and step-screw axis, as in aforesaid patent, is provided with a hanger, 38, in which is pivoted a rock-shaft, 37, having a crank and roller, 39, bearing upon the platform supporting the tongue $b'$, and there is a lever, 40, that is connected with the rock-shaft, and which lever is moved by the driver, so that he can raise or lower the frame and plow, the parts turning on the axle of the wheels.

The next feature of improvement relates to the top and weed turner. The top-turner is composed of sections $r$, pivoted or hinged through projecting flanges by bolts 18 to a head, $m$, upon which is a gear-wheel, $n$, receiving its motion from a cylindrical gear-wheel, $o$, that surrounds the axle and receives its motion from the ratchet-wheel $a^2$ and pawl upon the right-hand driving-wheel of the digger. There is a secondary gudgeon, $p$, below the gudgeon 14, and bolted to the same by the bolt 12. The plate 13 at the top of this secondary gudgeon forms a support for the wheel or head $m$, so that the same cannot drop off the gudgeon 14, and this secondary gudgeon sustains the hub of the leveler, hereinafter described. The hinged sections $r$ have heel-pieces that take against the under surface of the head $m$ and limit the downward movement; but the outer edges of the wings may lift up so as to pass any obstruction, such as a stone or hard lump of earth. There are downwardly-projecting teeth 46 at the outer edges of the wings or heads $r$, and these act as fingers to turn the weeds and potato-vines to the right and carry them down to the ground, or nearly so.

I apply to each of the sections $r$ an arm, 43, extending downwardly, and I place around the hub $u$ of the leveler-pinion a disk or circular flange, 44. The parts are constructed so that when the sections $r$ are moving around in the highest portions of the inclined turner—that is to say, to the left of the driver—the arms 43 are not in contact with the flange 44; but as the sections move downwardly and to the right with the revolving top-turner, the arms 43 come against the flange 44, and the hinged sections are raised to draw the fingers 46 up out of the tops or weeds and allow the same to lie down flat on the ground to the right of the line of potatoes. At present I prefer to make the fingers in the tapering form represented as being the most efficient; but I do not confine myself to any particular construction.

The leveler-fingers $t$ are made as bars that are curved or cranked downwardly at 48, and curved horizontally, as shown. The inner ends of these fingers are received into knuckle-pieces 50, that are bolted to the plate 51, that is supported by the arms $s$ from the hub $u$, the parts being revolved with the hub by the gearing 22 23, as in said application. These fingers $t$ are rotated more rapidly than the top and weed turner, so as to be sure of agitating the earth thoroughly and leveling the same below the potatoes before the teeth of the top-turner draw out of the tops. To effect this motion I employ the differential gears 22 23, the small beveled gear 22 at the upper end of the hub $u$ being within the large internal bevel-gear 23 on the under side of the head $m$. This causes the leveler to revolve in the opposite direction to the top-turner, but at a more rapid speed, so as to granulate and level the earth for the potatoes to fall upon, and at the same time the vines and weeds are laid down out of the way of the potatoes. These leveler-fingers $t$ are supported by the rest-piece 55, so that they will not drop beyond the proper place; but they are free to rise in clearing any obstruction, the inner end turning in the knuckle-piece 50.

In dry loose soil it is important that the fingers be swung inwardly, so as to be comparatively close together. This allows the earth to sift, and keeps the potatoes uppermost; but if the earth is moist or adhesive the fingers need to be opened farther, and stand more approximating radial lines to let the earth pass through in its moist condition. To adapt the digger to these different conditions I secure each knuckle-piece 50 to the plate 51 by a vertical bolt, on which it can be turned, and I provide a crank-pin, 60, on each knuckle, entering a slotted crown-plate, 61, below and in a recess in the plate 51, said crown-plate being attached by a central bolt and nut, 62. By loosening this nut the said crown-plate can be partially turned, and with it the knuckles will be moved and the leveling-fingers will be swung outwardly or inwardly for the purposes aforesaid. This change may also be effected by means of an adjusting-screw or any other suitable device.

I claim as my invention—

1. In a potato-digger, a top-turner formed of a head with sections hinged to the same and fingers extending down from their outer edges, substantially as set forth.

2. The combination, with the plow, in a potato-digger, of a revolving step-screw formed of the concave blades 34 and plates 35, both of which are perforated, substantially as set forth.

3. The combination, with the revolving head $m$ and hinged top-turners, of the arms 43 and the flange 44, for the purposes and substantially as set forth.

4. The combination, with the revolving hub $u$ and arms $s$, of the bottom plate, 51, the knuckles 50, and the fingers $t$, having shanks passing into and turning within the knuckles, substantially as set forth.

5. The combination, with a potato-digger plow, of a revolving leveler and mechanism for spreading or contracting the leveling-fingers, substantially as set forth.

6. The combination, with the plate 51, the knuckles 50, and the leveling-fingers $t$, of the crown-wheel 61, the crank-pins on the knuckles, and the bolt to clamp the crown-plate, substantially as set forth.

7. In combination with the step-screw head, the paddles 9, substantially as described, and for the purposes set forth.

8. The combination, with the plow, in a potato-digger, of a revolving hub and curved fingers extending outwardly and hinges for connecting the fingers to the hub-bars, substantially as set forth.

9. The combination, with the top and weed turner, of revolving leveling-fingers and differential gearing on the hub of the top-turner and leveler, respectively, gearing into each other, and a gear to rotate the top-turner, whereby the leveler is rotated with an accelerated motion, substantially as specified.

10. The top and weed turner, in combination with the gudgeon, on which it revolves, the auxiliary gudgeon for supporting the same, and the leveling-fingers supported by the auxiliary gudgeon, substantially as set forth.

11. The step-screw having the perforated plates 34, the sectoral perforated portions 35, and the twisted or screw-shaped connecting portions 10, and the cross-brace 11, substantially as set forth.

12. The combination, in a potato-digger, of a plow, a rotary step-screw, a revolving top and weed turner, and a horizontally-revolving leveler having yielding fingers, substantially as set forth.

13. The combination, with the top and weed turner, of the cylindrical gear and pinion for giving motion to the same, the revolving leveler, and the differential gears on the hub of the leveler, and top and weed turner, respectively, for rotating the former, substantially as set forth.

Signed by me this 21st day of October, A. D. 1882.

L. AUGS. ASPINWALL.

Witnesses:
HAROLD SERRELL,
WILLIAM G. MOTT.